(12) United States Patent  (10) Patent No.: US 8,542,182 B2
Nakade  (45) Date of Patent: Sep. 24, 2013

(54) VIDEO DISPLAY APPARATUS AND VIDEO DISPLAY METHOD

(75) Inventor: Tomoaki Nakade, Fukaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 187 days.

(21) Appl. No.: 13/081,401

(22) Filed: Apr. 6, 2011

(65) Prior Publication Data

US 2011/0181784 A1  Jul. 28, 2011

Related U.S. Application Data

(63) Continuation of application No. 12/351,467, filed on Jan. 9, 2009, now abandoned.

(30) Foreign Application Priority Data

Feb. 28, 2008  (JP) .................................. 2008-048354

(51) Int. Cl.
G09G 3/36 (2006.01)

(52) U.S. Cl.
USPC ........................................................ 345/102

(58) Field of Classification Search
USPC ......... 345/102, 207, 204, 211, 690; 348/254, 348/674; 362/97.1, 97.2, 97.3; 349/69, 70
See application file for complete search history.

(56) References Cited

U.S. PATENT DOCUMENTS

| | | | |
|---|---|---|---|
| 6,795,091 B2 | 9/2004 | Kim | |
| 6,850,259 B1 | 2/2005 | Rzepkowski et al. | |
| 6,952,195 B2 | 10/2005 | Arakawa | |
| 7,202,458 B2 | 4/2007 | Park | |
| 8,063,871 B2 * | 11/2011 | Lee et al. | ...................... 345/102 |
| 2004/0012556 A1 | 1/2004 | Yong et al. | |
| 2005/0057484 A1 | 3/2005 | Diefenbaugh et al. | |
| 2005/0190142 A1 | 9/2005 | Ferguson | |
| 2006/0077167 A1 | 4/2006 | Kim et al. | |
| 2006/0092182 A1 | 5/2006 | Diefenbaugh et al. | |
| 2006/0164442 A1 | 7/2006 | Furuhata et al. | |
| 2007/0274101 A1 | 11/2007 | Cho et al. | |

FOREIGN PATENT DOCUMENTS

| | | |
|---|---|---|
| CN | 1607884 | 4/2005 |
| CN | 1877691 | 12/2006 |
| CN | 101000754 | 7/2007 |
| EP | 1 696 414 | 8/2006 |
| JP | 5-6159 | 1/1993 |
| JP | 11-316566 | 11/1999 |

(Continued)

OTHER PUBLICATIONS

Japanese Patent Application No. 2009-180411, Notification of Reasons for Refusal, mailed Mar. 29, 2011, (English Translation).

(Continued)

*Primary Examiner* — Tom Sheng
(74) *Attorney, Agent, or Firm* — Blakely, Sokoloff, Taylor & Zafman LLP

(57) ABSTRACT

According to an aspect of the invention, a video display apparatus includes: a sensor that measures an external environment to output the external environment; a storing unit that stores a correction value associated with the measured value; a adjusting unit that changes the correction value based on a given operation by a user; and a processor that adjusts a picture quality of a picture to be displayed on a display based on the measured value and the correction value.

7 Claims, 5 Drawing Sheets

(56) References Cited

FOREIGN PATENT DOCUMENTS

| | | |
|---|---|---|
| JP | 2000-082137 | 3/2000 |
| JP | 2000-137474 | 5/2000 |
| JP | 2005318028 | 11/2005 |
| JP | 2007-011304 | 1/2007 |
| JP | 2007-043533 | 2/2007 |
| JP | 2007047439 | 2/2007 |
| JP | 2007-065680 | 3/2007 |
| KR | 10-2007/0080399 | 8/2007 |
| WO | WO-2006/129627 A1 | 12/2006 |

OTHER PUBLICATIONS

Chinese Patent Application No. 200910006254.3, Notification of the First Office Action, mailed Oct. 8, 2010 (English Translation).

European Patent Application No. 09150921.6-2202, Office Action/Search Report, mailed Dec. 1, 2010 (English Translation).

European Patent Application No. 09150921.6-2202, Communication, mailed Jul. 13, 2010.

European Patent Application No. 09150921.6-2202, Search Report, mailed Jun. 15, 2009.

* cited by examiner

VIDEO DISPLAY APPARATUS AND VIDEO DISPLAY METHOD

CROSS-REFERENCE TO RELATED APPLICATIONS

This application is a continuation application of U.S. patent application Ser. No. 12/351,467, filed Jan. 9, 2009, currently pending, and is based upon and claims the benefit of priority from Japanese Patent Application No. 2008-048354, filed Feb. 28, 2008, the entire contents of which are incorporated herein by reference.

BACKGROUND

1. Field

The present invention relates to a video display apparatus and a video display method.

2. Description of the Related Art

A conventional technique includes a video display apparatus for detecting time information and environment specifying information for specifying an environment of a user and correcting a picture quality of a displayed video based on them (for example, see JP-A-2007-43533).

The video display apparatus includes a time information acquiring portion for acquiring time information, an information acquiring portion for acquiring environment specifying information such as a weather, a control portion for comparing the time information and environment specifying information with a characteristic amount of a video signal which is input, thereby calculating a correction amount of the video signal, a picture quality processing portion for correcting a picture quality of the video signal based on the correction amount, and a display portion for displaying the video signal thus corrected, and can execute the picture quality correction which is suitable for an audio-visual environment of a user.

However, according to the conventional video display apparatus, the environment specifying information such as a weather is greatly changed depending on a place in which the video display apparatus is to be disposed, for example, a disposing condition that a living space is easily exposed to an outside light. For this reason, there is a disadvantage in that the video display apparatus is not suitable for a detailed picture quality correction corresponding to an audio-visual environment of a user. In the case in which morning, afternoon and night are decided based on the time information, it is impossible to uniquely determine the audio-visual environment of the user depending on a change in a time for a sunset due to a season or a latitude of a position in which the video display apparatus is to be disposed. Therefore, there is a disadvantage in that the video display apparatus is not suitable for the detailed picture quality correction.

SUMMARY OF THE INVENTION

According to an aspect of the present invention, there is provided a video display apparatus including: a display; a sensor that measures an external environment to output a measured value corresponding to the external environment; a storing unit that stores a correction value related with the measured value; a adjusting unit that changes the correction value based on a predetermined operation by a user; and a processor that adjusts a picture quality of a picture to be displayed on the display based on the measured value and the correction value, wherein the storing portion stores a plurality of correction values associated with the measured value, and wherein the adjusting unit changes the correction values respectively.

According to another aspect of the present invention, there is provided a video display apparatus including: a display; a sensor that measures an external environment to output a measured value corresponding to the external environment; a storing unit that stores a correction value related with the measured value; a adjusting unit that changes the correction value based on a predetermined operation by a user; and a processor that adjusts a picture quality of a picture to be displayed on the display based on the measured value and the correction value, wherein the sensor measures an illuminance as the measured value.

According to another aspect of the present invention, there is provided a video display apparatus including: a display; a sensor that measures an external environment to output a measured value corresponding to the external environment; a storing unit that stores a correction value related with the measured value; a adjusting unit that changes the correction value based on a predetermined operation by a user; and a processor that adjusts a picture quality of a picture to be displayed on the display based on the measured value and the correction value, wherein the correction value includes a backlight brightness adjusting value for adjusting a backlight brightness of the display, and wherein the processor adjusts the backlight brightness by using the backlight adjusting value.

According to another aspect of the present invention, there is provided a video display apparatus including: a display; a sensor that measures an external environment to output a measured value corresponding to the external environment; a storing unit that stores a correction value related with the measured value; a adjusting unit that changes the correction value based on a predetermined operation by a user; and a processor that adjusts a picture quality of a picture to be displayed on the display based on the measured value and the correction value, wherein the correction value includes an LCD panel set value for adjusting an LCD panel setting of the display, and wherein the processor adjusts the LCD panel setting by using the LCD panel set value, wherein the LCD panel set value is used for gamma correction of the LCD panel.

According to another aspect of the present invention, there is provided a video display method for a video display apparatus storing a correction value associated with an external environment; the method including: measuring the external environment; changing the correction value based on a given operation; adjusting a picture quality of a picture based on the measured external environment and the correction value.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

An embodiment of a video display apparatus and a video display method according to the invention will be described below in detail with reference to the drawings.
(Structure of Video Display Apparatus)

Figure 1:
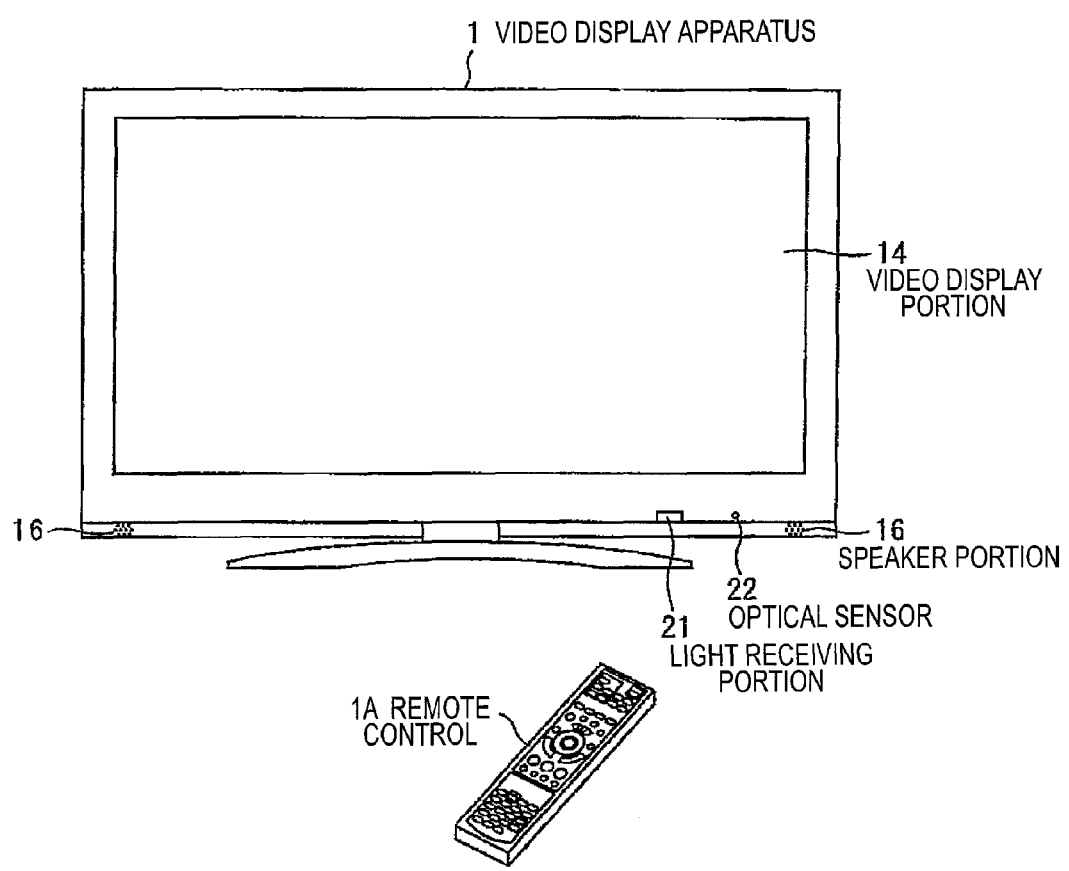
FIG. 1 is an exemplary schematic view showing a video display apparatus according to an embodiment of the invention.

FIG. 1 is a schematic view showing a video display apparatus according to the embodiment of the invention.

A video display apparatus 1 is a television image receptor for displaying a video upon receipt of a digital broadcast wave from an outside through an antenna which is not shown and displaying a video upon receipt of a video signal from a video reproducing apparatus such as an HDD (Hard Disc Drive) recorder or a DVD (Digital Versatile Disc) player which is not shown, and includes a video display portion 14 constituted by an LCD (Liquid Crystal Display) panel for displaying a video on a front surface, a speaker portion 16 for outputting a voice, a light receiving portion 21 for receiving an operating signal using an infrared ray transmitted from a remote control 1A having a plurality of operating switches, and an optical sensor 22 constituted by a photodiode for measuring an illuminance of an external environment. Moreover, the video display apparatus 1 includes an operating portion having an antenna terminal, an external input terminal and a plurality of switches (not shown) on a back face and electronic components constituted by a CPU (Central Processing Unit), an RAM (Random, Access Memory), an ROM (Read Only Memory) and an HDD which serve to process a video signal or an audio signal and to control each portion in a body.

Figure 2:
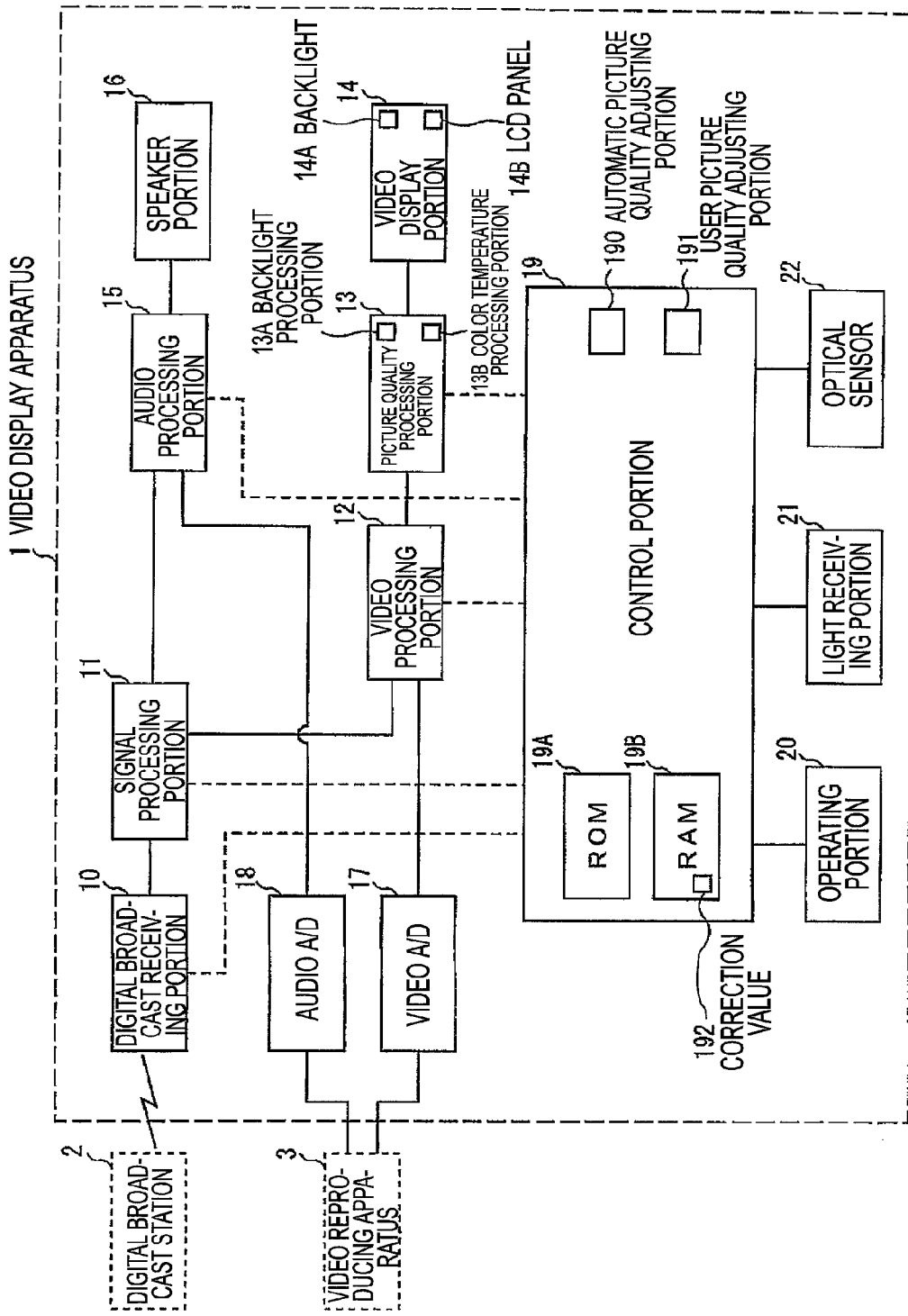
FIG. 2 is an exemplary block diagram showing an example of a structure of the video display apparatus according to the embodiment of the invention.

FIG. 2 is a block diagram showing an example of a structure of the video display apparatus according to the embodiment of the invention.

The video display apparatus 1 includes a digital broadcast receiving portion 10 for receiving a broadcast signal transmitted from a digital broadcast station 2, and the digital broadcast receiving portion 10 is connected to a signal processing portion 11. The signal processing portion 11 is connected to an audio processing portion 15 and a video processing portion 12, separates a received broadcast signal into an audio signal and a video signal, and outputs the audio signal to the audio processing portion 15 and outputs the video signal to the video processing portion 12.

The audio processing portion 15 is connected to the speaker portion 16, and the video processing portion 12 is connected to the video display portion 14 constituted by a CRT or a liquid crystal display panel through a picture quality processing portion 13 for adjusting a picture quality. The audio processing portion 15 adjusts a tone of the input audio signal.

The picture quality processing portion 13 adjusts the picture quality of the input video signal and outputs the video signal subjected to the picture quality adjustment to the video display portion 14. The picture quality processing portion 13 has a backlight processing portion 13A and a color temperature processing portion 13B which serve to adjust the display of the video display portion 14. The video display portion 14 has a backlight 14A for causing a brightness to be variable through a control by an inverter and an LCD panel 14B for displaying a video through an irradiation on the backlight 14A. The backlight processing portion 13A serves to change a brightness value of the backlight 14A, thereby adjusting a display and the color temperature processing portion 13B serves to change a γ set value of the LCD panel 14B, thereby adjusting a display of a color temperature.

The video display apparatus 1 includes a video analog/digital converter (A/D) 17 and an audio A/D 18 which receive video and audio signals transmitted from a video reproducing apparatus 3 connected to an external input terminal which is not shown, and the video and audio signals input to the video A/D 17 and the audio A/D 18 are converted from analog signals into digital signals and the outputs are connected to the video processing portion 12 and the audio processing portion 15 respectively.

The video display apparatus 1 includes a control portion 19 for controlling each portion through a control line shown in a dotted line of FIG. 2, and an operating portion 20 constituted by an operating switch, the light receiving portion 21 for receiving an operating signal of an infrared ray of the remote control 1A, and the optical sensor 22 for measuring an illuminance of an external environment are connected to the control portion 19.

The control portion 19 has an ROM 19A for storing a program for controlling each portion, an RAM 19B for temporarily storing information and aiding an operation of the control portion 19, and an automatic picture quality adjusting portion 190 and a user picture quality adjusting portion 191.

The RAM 19B stores a correction value 192 relating an illuminance of an external environment to a picture quality adjusting set value which will be described below.

The automatic picture quality adjusting portion 190 determines a picture quality adjusting set value based on a video type output through an analysis of the video signal input by the video processing portion 12 and determines a picture quality adjusting set value based on the illuminance of the external environment which is measured by the optical sensor 22 and the correction value 192, and controls the picture quality processing portion 13 based on the picture quality adjusting set value thus determined. The automatic picture quality adjusting portion 190 is operated at a time interval on a unit of a field of video information and adjusts a picture quality of the video information which is input dynamically. The automatic picture quality adjusting portion 190 may determine a tone adjusting set value together with the tone adjusting set value to control the audio processing portion 15 based on the tone adjusting set value thus determined.

The user picture quality adjusting portion 191 can change the picture quality adjusting set value of the correction value 192 based on the operating signal received in the operating portion 20 or the light receiving portion 21. The details of the change will be described below.

Figure 3:
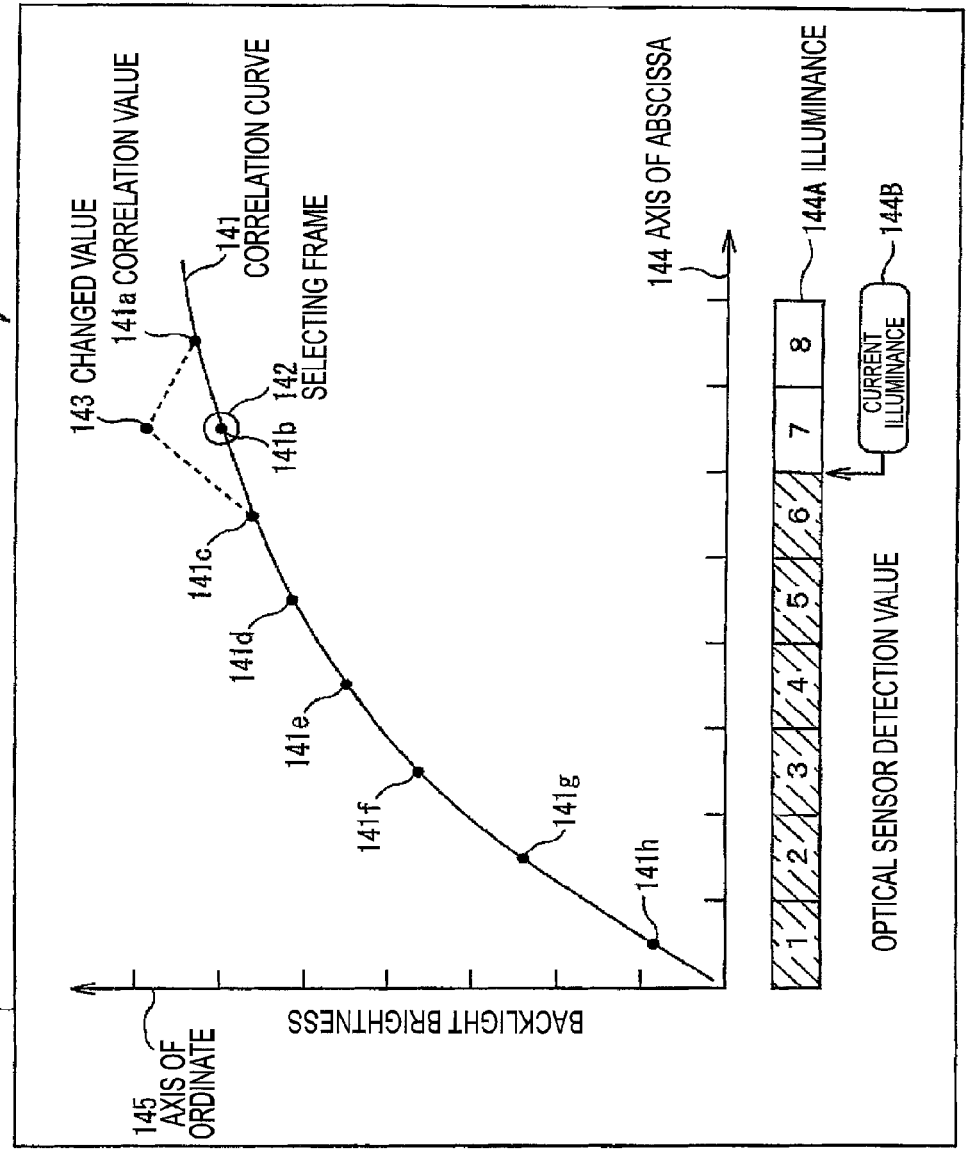
FIG. 3 is an exemplary schematic chart showing an example of a display of a picture quality adjusting screen according to the embodiment of the invention.

FIG. 3 is a schematic chart showing an example of a display of a picture quality adjusting screen according to the embodiment of the invention.

A picture quality adjusting screen 140 is displayed on the video display portion 14 in the case in which an operating signal indicative of contents for starting the user picture quality adjusting portion 191 is received in the operating portion 20 or the light receiving portion 21, and has a correlation curve 141 indicative of a correlation between an illuminance and a backlight brightness, a selecting frame 142 for selecting correlation values 141a to 141h on the correlation curve, and a changed value 143 obtained by changing the correlation value selected by the selecting frame 142 on a graph in which an axis of abscissa 144 indicates an optical sensor detection value to be an illuminance measured by the optical sensor 22 and an axis of ordinate 145 indicates a backlight brightness set to the backlight 14A. The correlation values 141a to 141h and the correlation curve 141 are drawn by reading the correction value 192 of the RAM 19B through the user picture quality adjusting portion 191. Initial values of the correlation values 141a to 141h and the correlation curve 141 are indicated as the correlation curve 141 shown in a solid line of FIG. 3 and the correlation values 141a to 141h on the correlation curve 141.

The picture quality adjusting screen 140 has an illuminance 144A displayed in eight stages, for example, corresponding to the axis of abscissa 144 and a current illuminance 144B indicative of a value during the measurement of the optical sensor 22. For example, illuminances "1" to "4", illuminances "5" and "6" and illuminances "7" and "8" are set to correspond to illuminances at night, illuminances in a transition from night to day, and illuminances during day, respectively.

When the correlation values 141a to 141h are changed, for example, the correlation value 141b is changed into the changed value 143, the correlation curve 141 is changed to connect the changed value 143 to the correlation values 141a and 141c (a dotted line). The correlation values 141a to 141h are stored as the correction value 192 in the RAM 19B. In the case in which the correlation values 141a to 141h are changed into changed values in the picture quality adjusting screen 140, the user picture quality adjusting portion 191 updates the contents of the correction value 192. Although the changed value 143 indicates a value obtained by changing the correlation value 141b in FIG. 3, any or all of the correlation values 141a to 141h can also be changed.

(Operation)

An operation of an electronic apparatus according to the embodiment of the invention will be described below with reference to each of the drawings.

A digital broadcast wave transmitted from the digital broadcast station 2 is input to the digital broadcast receiving portion 10 through an antenna which is not shown.

The digital broadcast receiving portion 10 demodulates the received signal through a demodulator (not shown) corresponding to a ground wave digital broadcast modulating method, extracts a data sequence (a transport stream) based on MPEG2 standards and outputs the data sequence to the signal processing portion 11, for example.

The data sequence (the transport stream) input to the signal processing portion 11 is separated into an audio signal (digital) and a video signal (digital) by an MPEG2 decoder (not shown), for example, and the audio signal is output to the audio processing portion 15 and the video signal is output to the video processing portion 12.

The video processing portion 12 detects a video type of the input video signal (digital) and outputs a video type signal to be a detection result to the automatic picture quality adjusting portion 190.

The automatic picture quality adjusting portion 190 determines a picture quality adjusting set value based on the video type signal and determines the picture quality adjusting set value based on the illuminance of the external environment which is measured by the optical sensor 22 and the correction value 192. The user picture quality adjusting portion 191 changes the correlation values 141a to 141h to obtain changed values, thereby changing the correction value 192 in the picture quality adjusting screen 140 shown in FIG. 3 based on the operating contents of the operating portion 20 or the remote control 1A.

Next, the picture quality processing portion 13 adjusts a picture quality of the video signal based on the picture quality adjusting set value, and then converts the video signal into an analog signal and outputs the analog signal to the video display portion 14 constituted by a CRT or an LCD if necessary. In the case in which the picture quality adjusting set value has contents for controlling the video display portion 14, the picture quality processing portion 13 controls the video display portion 14 based on the picture quality adjusting set value. The backlight processing portion 13A of the picture quality processing portion 13 controls the brightness value of the backlight 14A based on the backlight set value included in the picture quality adjusting set value, and the color temperature processing portion 13B controls the $\gamma$ set value of the LCD panel 14B based on the LCD panel set value included in the picture quality adjusting set value, thereby controlling the color temperature displayed on the video display portion 14.

The audio processing portion 15 executes a processing of converting an input audio signal (digital) into an analog audio signal and outputs the analog audio signal to the speaker portion 16.

Figure 4:
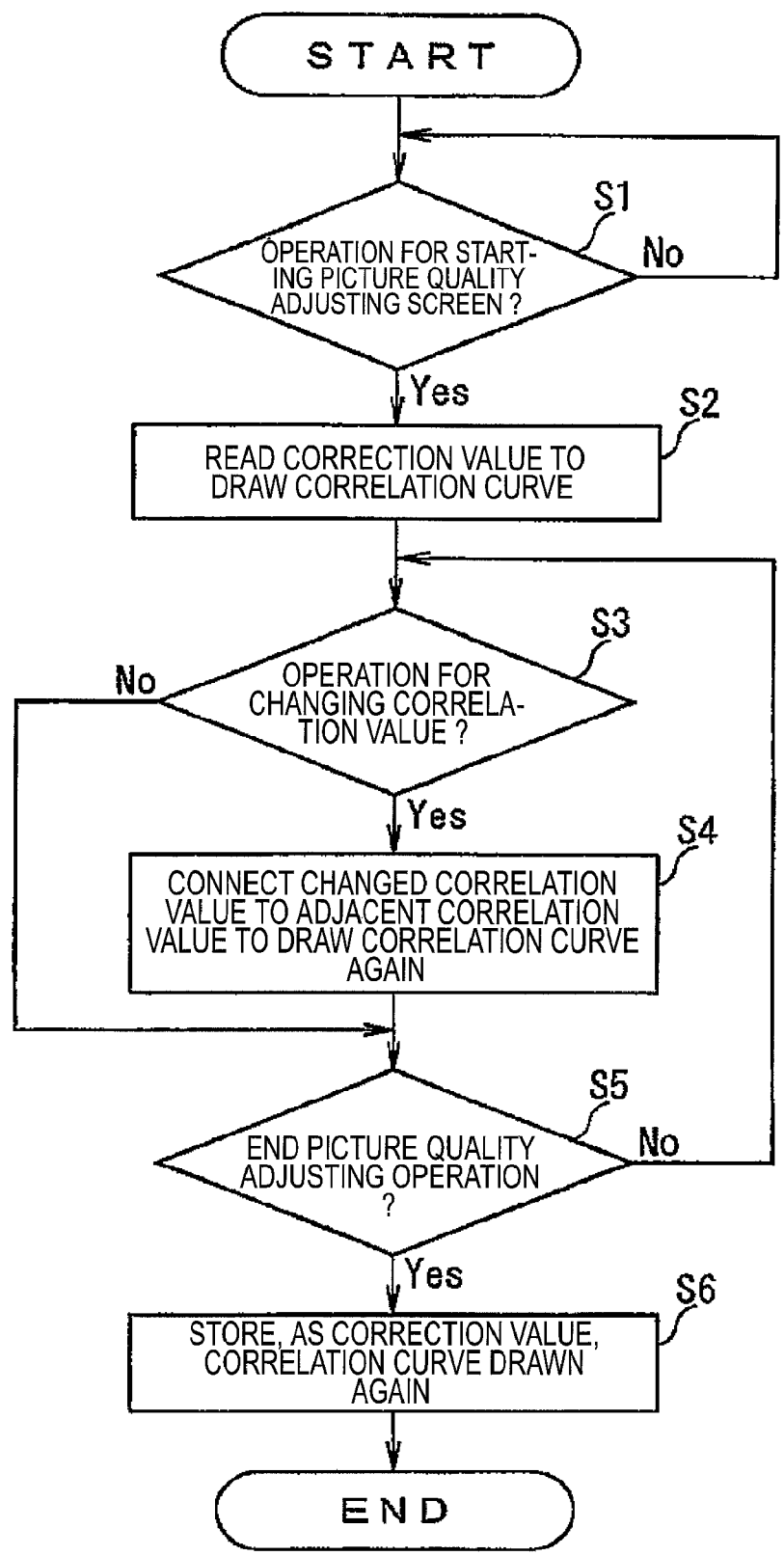
FIG. 4 is an exemplary flowchart showing an example of an operation of the video display apparatus according to the embodiment of the invention.

FIG. 4 is a flowchart showing an example of an operation of the video display apparatus according to the embodiment of the invention.

When first inputting an operating signal indicative of the contents for starting the user picture quality adjusting portion 191 from the operating portion 20 or the light receiving portion 21 (S1; Yes), the user picture quality adjusting portion 191 reads the correction value 192 from the RAM 19B to draw the correlation curve 141 on the picture quality adjusting screen 140 shown in FIG. 3 (S2).

When the operating signal indicative of the contents for changing the backlight brightnesses of the correlation values 141a to 141h is input from the operating portion 20 or the light receiving portion 21 (S3; Yes), the user picture quality adjusting portion 191 connects the changed correlation value (the changed value) to an adjacent correlation value and draws a new correlation curve 141 again (S4).

The Steps S3 and S4 are repeated in the picture quality adjusting screen 140 (S5; No). When receiving an operating signal indicative of the contents for ending the picture quality adjusting operation (S5; Yes), then, the user picture quality adjusting portion 191 stores the correlation values 141a to 141h of the correlation curve 141 drawn again as correction values in the RAM 19B (S6).

Figure 5:
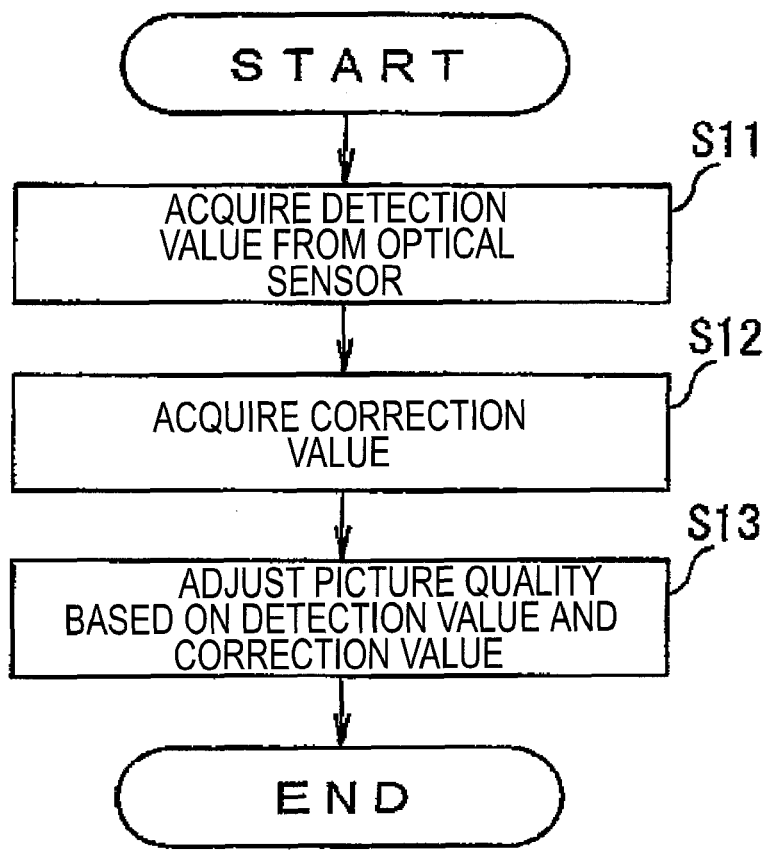
FIG. 5 is an exemplary flowchart showing an example of the operation of the video display apparatus according to the embodiment of the invention.

FIG. 5 is a flowchart showing an example of an operation of the video display apparatus according to the embodiment of the invention.

The automatic picture quality adjusting portion 190 is always operated when the power supply of the video display apparatus 1 is turned ON, and Steps S11 to S13 which will be described below are repeated at a predetermined interval.

The automatic picture quality adjusting portion 190 first acquires a detection value from the optical sensor 22 (S11). The automatic picture quality adjusting portion 190 subsequently acquires the correction value 192 stored in the RAM 19B (S12), and determines a picture quality adjusting set value based on the detection value and the corrected value 192 and outputs the picture quality adjusting set value to the picture quality processing portion 13 (S13).

ADVANTAGE OF THE EMBODIMENT

According to the embodiment, it is possible to independently correct the correlation values 141a to 141h relating the backlight brightness value to the detection value of the optical sensor 22 respectively, thereby storing the new correction value 192. Therefore, it is possible to execute an optimum picture quality adjustment corresponding to an installing environment of the video display apparatus 1 and the audio-visual environment of the user. For example, when a sunlight comes in through a window during day in a situation in which the video display apparatus 1 is provided with the window set to a back, the optical sensor 22 does not detect an illuminance felt by the user because it is provided on the front surface of the video display apparatus 1 (for example, although the user feels the illuminance of "8" in the illuminance 144A, the optical sensor 22 feels only the illuminance of "6"). However, it is possible to cope with a shift of the illuminance felt by the user from the illuminance detected by the optical sensor 22 by setting the backlight brightness of the correlation value 141*a* to be raised through the user picture quality adjusting portion 191. Thus, the brightness of the video display portion 14 can be optimized for the user. In a situation in which the sunlight does not come in through the window and the illuminance detected by the optical sensor 22 and the illuminance felt by the user are coincident with each other (for example, the illuminance of "5" in the illuminance 144A is felt), the change in the correlation value 141*a* has no influence.

At night in which the sunlight does not come in, the illuminance detected by the optical sensor 22 depends on only a lighting apparatus. Therefore, also in different rooms, an equal illuminance is detected when the same lighting apparatus is used. However, the illuminance felt by the user makes a difference depending on a color of a wall or a floor in the room. For example, the user feels a room having a brown wall and floor to be darker than a room having a white wall and floor. In the room having the brown wall and floor, the optical sensor 22 detects the illuminance of "3" in the illuminance 144A. In the case in which the user feels dazzling with the backlight brightness of the correlation value 141*f*, it is possible to cope with the shift of the illuminance felt by the user from the illuminance detected by the optical sensor 22 by reducing the backlight illuminance of the correlation value 141*f*. Thus, the brightness of the video display portion 14 can be optimized for the user.

Since the correction value 192 depends on only the illuminance and does not require time information, it is not influenced by a season or a latitude. The picture quality processing portion 13 carries out the picture quality processing over the video signal, and furthermore, adjusts the display of the backlight 14A and the LCD panel 14B in the video display portion 14. Therefore, it is possible to carry out the picture quality correction more widely.

Although the color temperature processing portion 13B controls the LCD panel 14B in the embodiment, it is also possible to adjust other items such as a contrast of the LCD panel 14B in addition to the adjustment of the color temperature. It is possible to carry out various changes without departing from the scope of the invention in addition to the adjustment of the picture quality. For example, it is also possible to employ a structure in which a microphone for detecting a noise of an external environment is provided to change a correction value of an audio signal based on the noise.

As described with reference to the embodiment, there is provided a video display apparatus and a video display method which can execute an optimum picture quality adjustment corresponding to an audio-visual environment of a user.

According to the embodiment, it is possible to execute an optimum picture quality adjustment corresponding to an audio-visual environment of a user.

What is claimed is:

1. A video display apparatus comprising:
   a sensor that measures an illuminance at the video display apparatus;
   a picture quality adjusting portion that, while displaying a relation between a plurality of illuminances and a plurality of picture quality adjusting set values and a currently-measured illuminance on a display portion as a graph, changes the picture quality adjusting set value correlated with a selected illuminance selected from the illuminances based on an operation of an operating portion, wherein the graph includes an axis of abscissa indicating the plurality of illuminances and an axis of ordinate indicating the plurality of picture quality adjusting set values;
   a storing portion that stores, connectedly with the selected illuminance, the picture quality adjusting set value changed by the picture quality adjusting portion; and
   a picture quality processing portion that adjusts a picture quality of an input video signal by acquiring, according to the currently-measured illuminance, the picture quality adjusting set value correlated with the currently-measured value from the storing portion.

2. The video display apparatus according to claim 1, wherein the picture quality adjusting portion includes:
   an automatic picture quality adjusting portion configured to determine the picture quality adjusting set value based on the currently-measured value; and
   a user picture quality adjusting portion configured to display the graph representing the relation between the plurality of illuminances and the plurality of picture quality adjusting set values on the display portion, to allow the user to select one of the plurality of picture quality adjusting set values through the graph, and to change the selected value.

3. The video display apparatus according to claim 1, further comprising:
   a video processing portion configured to analyze a video type of the input video signal,
   wherein the automatic picture quality adjusting portion determines the picture quality adjusting set value based also on the analyzed video type.

4. A video display apparatus comprising:
   a sensor that measures an illuminance at the video display apparatus;
   a display portion;
   a picture quality adjusting portion that, while displaying a relation between a plurality of illuminances and a plurality of picture quality adjusting set values and a currently-measured illuminance on the display portion as a graph, changes the picture quality adjusting set value correlated with a selected illuminance selected from the illuminances based on an operation of an operating portion, wherein the graph includes an axis of abscissa indicating the plurality of illuminances and an axis of ordinate indicating the plurality of picture quality adjusting set values;
   a storing portion that stores, connectedly with the selected illuminance, the picture quality adjusting set value changed by the picture quality adjusting portion; and
   a picture quality processing portion that adjusts a picture quality of an input video signal by acquiring, according to the currently-measured illuminance, the picture quality adjusting set value correlated with the currently-measured value from the storing portion.

5. The video display apparatus according to claim 4, wherein
- the storing portion stores a backlight brightness as the picture quality adjusting set value, and
- the picture quality processing portion adjusts the backlight brightness of the display portion as the display adjustment.

6. The video display apparatus according to claim 4, wherein
- the storing portion stores a gamma setting value of an LCD panel and a contrast of the LCD panel, and
- the picture quality processing portion adjusts the gamma setting value and the contrast as the display adjustment.

7. A video display method comprising:
- measuring by a sensor an illuminance at the video display apparatus;
- while displaying a relation between a plurality of illuminances and a plurality of picture quality adjusting set values and a currently-measured illuminance as a graph, changing the picture quality adjusting set value correlated with a selected illuminance selected from the illuminances based on an operation of an operating portion, wherein the graph includes an axis of abscissa indicating the plurality of illuminances and an axis of ordinate indicating the plurality of picture quality adjusting set values; and
- adjusting a picture quality of an input video signal by acquiring, according to the currently-measured illuminance, the picture quality adjusting set value correlated with the currently-measured value from the storing portion.

* * * * *